US008871339B2

(12) United States Patent
Tsai et al.

(10) Patent No.: US 8,871,339 B2
(45) Date of Patent: Oct. 28, 2014

(54) MODIFIED CLAY AND CLAY-POLYMER COMPOSITE

(75) Inventors: Tsung-Yen Tsai, Pingjhen (TW);
Shau-Tai Lu, Guan Si Township (TW);
Chia-Hsiang Liu, Phinjhen (TW);
Chun-Chieh Huang, Sinjhuang (TW);
Hsien-Chung Tsai, Hsinchu (TW);
Jen-Chun Lin, Hsinchu (TW)

(73) Assignees: Chung Yuan Christian University, Jhongli (TW); China Glaze Co., Ltd., Hsinchu (TW)

( * ) Notice: Subject to any disclaimer, the term of this patent is extended or adjusted under 35 U.S.C. 154(b) by 551 days.

(21) Appl. No.: 12/395,423

(22) Filed: Feb. 27, 2009

(65) Prior Publication Data
US 2009/0317627 A1    Dec. 24, 2009

(30) Foreign Application Priority Data

Jun. 24, 2008   (TW) .............................. 97123485 A (51) Int. Cl.
| C09K 21/14 | (2006.01) |
| C01B 33/44 | (2006.01) |
| C08B 9/02 | (2006.01) |
| C08K 3/36 | (2006.01) |
| C08K 3/04 | (2006.01) |
| C08L 63/00 | (2006.01) |

(52) U.S. Cl.
CPC ........... C09K 21/41 (2013.01); C08K 2003/045 (2013.01); C01B 33/44 (2013.01); C08L 63/00 (2013.01); C08B 9/02 (2013.01); C08K 3/36 (2013.01); Y10S 428/921 (2013.01)
USPC ........... 428/325; 524/445; 524/495; 524/496; 428/921; 252/609

(58) Field of Classification Search
CPC .. C01B 33/44; C01B 31/0213; C01B 31/022; C07C 2104/00; H01L 51/0046–51/0049; C08K 3/346; C08K 2003/045; C09C 1/42; C09K 21/14
See application file for complete search history.

(56) References Cited

U.S. PATENT DOCUMENTS

| 3,953,565 A | 4/1976 | Mizutani et al. |
| 4,070,315 A | 1/1978 | Mehta et al. |

(Continued)

FOREIGN PATENT DOCUMENTS

| JP | 2003-95640 | 4/2003 |
| JP | 2007-39685 | 2/2007 |

(Continued)

OTHER PUBLICATIONS

Willems et al., "Kinetic Modeling of the Thermal Cracking of Hydrocarbons", Industrial & Engineering Chemical Research vol. 27 (1988), pp. 1966-1971.*

(Continued)

Primary Examiner — Alicia Chevalier
Assistant Examiner — Scott R Walshon
(74) Attorney, Agent, or Firm — Muncy, Geissler, Olds & Lowe, P.C.

(57) ABSTRACT

A modified clay is provided, which includes a layered clay material intercalated with a modifier having a conjugated double bond and capable of producing free radicals when heated. A clay-polymer composite is also provided, which includes a polymer material and the modified clay, wherein the modified clay is dispersed in the polymer material and at least partially exfoliated. The modifier is capable of producing free radicals when heated to scavenge free radicals generated from thermal cracking or burning of the polymer material to prevent further thermal cracking of the polymer material.

7 Claims, 7 Drawing Sheets

(56) References Cited

U.S. PATENT DOCUMENTS

| | | | |
|---|---|---|---|
| 4,105,578 A * | 8/1978 | Finlayson et al. | 516/101 |
| 4,107,376 A | 8/1978 | Ishikawa | |
| 4,273,879 A | 6/1981 | Langer et al. | |
| 4,280,949 A | 7/1981 | Dieck | |
| 4,373,047 A | 2/1983 | Cohen et al. | |
| 4,386,027 A | 5/1983 | Cohen | |
| 4,472,538 A | 9/1984 | Kamigaito et al. | |
| 4,582,866 A | 4/1986 | Shain et al. | |
| 4,639,486 A | 1/1987 | Liu | |
| 4,708,975 A | 11/1987 | Shain | |
| 4,826,899 A | 5/1989 | Rees | |
| 4,981,521 A | 1/1991 | Bettacchi et al. | |
| 5,104,735 A | 4/1992 | Cioffi et al. | |
| 5,153,251 A | 10/1992 | Lupinski et al. | |
| 5,204,395 A | 4/1993 | Lupinski | |
| 5,294,654 A | 3/1994 | Hellstern-Burnell et al. | |
| 5,473,007 A | 12/1995 | Kwon et al. | |
| 5,686,514 A | 11/1997 | Bayha et al. | |
| 5,773,502 A | 6/1998 | Takekoshi et al. | |
| 5,779,775 A | 7/1998 | Kuwabara et al. | |
| 5,863,974 A | 1/1999 | Tjahjadi et al. | |
| 5,886,072 A | 3/1999 | Linsky et al. | |
| 6,011,087 A | 1/2000 | Marshall et al. | |
| 6,025,421 A | 2/2000 | Atarashi et al. | |
| 6,162,926 A * | 12/2000 | Murphy et al. | 548/417 |
| 6,180,695 B1 | 1/2001 | Ito et al. | |
| 6,207,085 B1 | 3/2001 | Ackerman | |
| 6,414,070 B1 | 7/2002 | Kausch et al. | |
| 6,423,768 B1 * | 7/2002 | Khouri | 524/445 |
| 6,610,770 B1 | 8/2003 | Ross et al. | |
| 7,288,299 B2 * | 10/2007 | Tregub et al. | 428/14 |
| 2007/0290410 A1 * | 12/2007 | Koo et al. | 264/497 |
| 2009/0014691 A1 * | 1/2009 | Kint et al. | 252/500 |

FOREIGN PATENT DOCUMENTS

| | | |
|---|---|---|
| JP | 2007-308315 | 11/2007 |
| TW | I297729 | 12/1993 |
| TW | 200410904 | 7/2004 |
| TW | 200411005 | 7/2004 |
| TW | 200842107 | 11/2008 |
| WO | WO 2005/095506 | 10/2005 |
| WO | WO 2006037949 A1 * | 4/2006 |
| WO | WO 2007/119231 | 10/2007 |

OTHER PUBLICATIONS

Saxby et al., "Thermogravimetric Analysis of Buckminsterfullerene and Related Materials in Air", Journal of Physical Chemistry vol. 96 (1992), pp. 17-18.*

Wang et al., "Solvent-free Reactions of Fullerenes and N-alkylglycines with and without Aldehydes Under High-Speed Vibration Milling", Tetrahedron vol. 59 (2003), pp. 55-60.*

Wang et al., "Preparation and Characterization of Flame Retardant ABS/Montmorillonite Nanocomposite", Applied Clay Science vol. 25 (2004), pp. 49-55.*

Aguado et al., Feedstock Recycling of Plastic Wastes, Royal Society of Chemistry (1999), Chapter 4, pp. 73-91.*

Bourbigot et al., "Polymer Nanocomposites: How to Reach Low Flammability?", Macromol. Symp. vol. 233 (2006), pp. 180-190.*

* cited by examiner

MODIFIED CLAY AND CLAY-POLYMER COMPOSITE

CROSS REFERENCE TO RELATED APPLICATIONS

This Application claims priority of Taiwan Patent Application No. 097123485, filed on Jun. 24, 2008, the entirety of which is incorporated by reference herein.

BACKGROUND OF THE INVENTION

1. Field of the Invention

The present invention relates to modified clay, and in particular relates to a flame-retardant clay-polymer composite formed by using the modified clay.

2. Description of the Related Art

Polymer materials are used in a wide variety of applications, such as electronic devices, construction materials, automobile materials, daily necessities products and so on. Take electronic package applications as an example, electronic packages are used to integrate and package a plurality of semiconductor integrated circuits. Electronic packages provide functions of electrical power transmission, signal transmission, heat dissipation, protection, and structural support. For electronic package applications, thermosetting resins, such as epoxy, are frequently used to serve as a printed circuit board material. Usually, a composite material substrate is used to form a printed circuit board. Strengthening fibers, such as glass fibers, are combined with the resin to form the composite material substrate. Composite materials are capable of providing excellent mechanical strength and size stability.

However, due to inherent material characteristics of polymer materials, after being heated, polymer materials may be easily damaged by softening or burning. In conventional techniques, to solve the problem mentioned above, a flame retardant including a high amount of bromine, such as brominated resin, is added into polymer materials. Although adding brominated resin is helpful for flame retardation, after being heated, polymer materials with brominated resin will produce a lot of smoke and even generate hydrogen halide or dioxin with corrosiveness and toxicity, causing serious environmental problems. Halogen and phosphate free methods are desired to produce flame retardant polymer materials.

U.S. Pat. No. 4,708,975 and U.S. Pat. No. 4,826,899 disclose a copolymer comprising an organophilic clay and a flame retardant containing halogen. The clay is added to the copolymer to increase the formation of a coke layer. U.S. Pat. No. 6,414,070 discloses adding an organic modified clay to a copolymer to improve a self extinguishing property during an MVSS-302 test.

Other patents using clay to improve flame-retardant properties of polymer materials comprise U.S. Pat. No. 6,011,087, U.S. Pat. No. 6,414,070, U.S. Pat. No. 5,779,775, U.S. Pat. No. 6,025,421, U.S. Pat. No. 6,180,695, U.S. Pat. No. 4,708,975, U.S. Pat. No. 4,826,899, U.S. Pat. No. 4,582,866, U.S. Pat. No. 6,610,770, U.S. Pat. No. 5,104,735, U.S. Pat. No. 4,107,376, U.S. Pat. No. 6,207,085, U.S. Pat. No. 4,273,879, U.S. Pat. No. 5,886,072, U.S. Pat. No. 4,981,521, U.S. Pat. No. 5,686,514, U.S. Pat. No. 5,473,007, U.S. Pat. No. 4,472,538, U.S. Pat. No. 3,953,565, U.S. Pat. No. 4,070,315, U.S. Pat. No. 5,863,974, U.S. Pat. No. 5,773,502, U.S. Pat. No. 5,204,395, U.S. Pat. No. 5,294,654, U.S. Pat. No. 5,153,251, U.S. Pat. No. 4,639,486, U.S. Pat. No. 4,386,027, U.S. Pat. No. 4,373,047 or U.S. Pat. No. 4,280,949 and so on. For the patents, flame-retardant properties are improved, by adding flame retardants with halogen, phosphate, or antimony oxide. Although the added clay may produce the coke layer, the improvement in flame-retardant properties is achieved mainly by adding other inorganic materials or flame retardants to the polymers.

BRIEF SUMMARY OF THE INVENTION

In accordance with an embodiment of the invention, a modified clay is provided, comprising a layered clay material intercalated with a modifier, wherein the modifier has a conjugated double bond and is capable of producing free radicals when heated.

In accordance with another embodiment of the invention, a clay-polymer composite is provided, comprising a polymer material and the modified clay of the embodiments of the present invention, wherein the modified clay is dispersed in the polymer material and at least partially exfoliated, and wherein the modifier is capable of producing free radicals when heated to scavenge free radicals generated from thermal cracking or burning of the polymer material to prevent further thermal cracking of the polymer material.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Modified clays of embodiments of the present invention are derived by intercalation of a modifier having a conjugated double bond structure into a layered clay material. Clay-polymer composites of embodiments of the present invention are polymer materials dispersed with the modified clay, wherein the modified clay is at least partially exfoliated. Surface of the exfoliated clay is bonded with the modifier. The modifier having a conjugated double bond structure is capable of producing free radicals after being heated to scavenge free radicals generated from thermal cracking or burning of the clay-polymer composite. Thus, further thermal cracking of the polymer material caused by the generated free radicals may be prevented. The structural stability and the flame-retardant property of the clay-polymer composite may be improved.

For typical polymer materials or polymer composites, a variety of free radicals, such as H. or OH. are easily generated due to chemical bond breaking or burning of the polymer materials when the temperature is near or above the thermal cracking temperature. The generated free radicals may attack the polymer material and induce further thermal cracking, destroying structural integer of the polymer material and lowering their flame-retardant properties. Thus, after being heated, conventional polymer materials or polymer composites may easily softened or be destroyed. Therefore, conventional polymer materials or polymer composites does not provide sufficient heat retardation. Embodiments of the present invention introduce a modified clay into a polymer material to form a clay-polymer composite to solve the problems mentioned above.

A suitable layered clay material of an embodiment of the invention may be a natural clay or a synthetic inorganic layered material, such as smectite clay, vermiculite, halloysite, sericite, mica, layered double hydroxide (LDH), zirconium phosphate derivatives, or combinations thereof. In one embodiment, the layered clay material is a cation exchange type, such as an inorganic layered material cation exchangeable. The layered clay material may have a cation-exchange capacity ranging from about 50 to 300 meq/100 g. In another embodiment, the layered clay material is an anion exchange type, such as an inorganic layered material anion exchangeable. The layered clay material may have an anion-exchange capacity ranging from about 50 to 1000 meq/100 g.

A suitable modifier of an embodiment of the invention may have a conjugated double bond structure capable of producing free radicals after being heated. The conjugated double bond structure may comprise a C—C double bond, a C—N double bond, an N—N double bond, a C—O double bond, or combinations thereof. A suitable modifier may comprise modified $C_{60}$ (modified fullerene), modified carbon nanocapsule, modified carbon nanotube, modified graphite, or combinations thereof. Since $C_{60}$, carbon nanocapsule, carbon nanotube, or graphite have many C—C double bonds, these materials possess excellent ability for scavenging free radicals. For example, the C—C double bond may be broken at a suitable temperature to produce free radicals. The produced free radicals may scavenge free radicals generated from thermal cracking or burning of the polymer material to prevent or stop further thermal cracking of the polymer material caused by the generated free radicals. Therefore, the structural integer of the polymer material may be maintained to retard heat and increase flame-retardant property.

In one embodiment, the modifier is preferably capable of producing free radicals at a temperature near the thermal cracking temperature of the polymer material. Typically, the thermal cracking temperature of polymer materials is between about 250° C. and 500° C. Thus, the modifier of an embodiment of the invention preferably produces free radicals only after being heated to over 300° C., such as between about 340° C. and about 450° C. In another embodiment, the modifier preferably produces a majority of radicals after being heated, for example, to between 340° C. and 450° C. Thus, one skilled in the art may use suitable modifiers according to the thermal cracking temperature of the polymer material.

A modified clay of one embodiment of the invention may be formed by ion exchange between the layered clay material and the cation or anion of the modifier. The modifier may be bonded to the layered clay material through ion exchange. The amount of the bonded or intercalated modifier may range from about 20% to 120% of the ion exchange capacity and preferably range from about 50% to 70%.

In addition, if the modifier can not be directly bonded or intercalated to the layered clay material, it will be necessary to first modify the modifier. Take $C_{60}$ as an example. $C_{60}$ may first be modified into a soluble state and then be intercalated into the layered clay material through ion exchange. In one embodiment, formaldehyde and N-methylglycine are used to modify $C_{60}$. Thus, allowing the modified $C_{60}$ to be bonded or intercalated into the layered clay material through cation exchange. In another embodiment, besides using formaldehyde and N-methylglycine, benzalkonium chloride may further be added to modify $C_{60}$. Carbon nanocapsule, carbon nanotube, or graphite may be modified by, but not limited to, similar methods. Any modification method which can make the surface of the modifier have a functional group capable of bonding or intercalating into the surface of the layered clay material may be adopted. For example, a redox reaction, a cycloaddition reaction, a radical addition reaction may be applied to form a functional group, such as —OH, —C=O, —CHO, —COOH, —NHAr, —N$^+$(CH$_3$)$_2$Ar, amino group, =CCl$_2$, —OSO$_3^-$, or —C(CH$_3$)$_2$CN to the surface of the modifier, thus making the modifier capable of bonding or intercalating into the layered clay material.

The modifier of embodiments of the invention is not limited to compounds having a C—C double bond. Another conjugated double bond compounds having a C—N double bond, an N—N double bond, a C—O double bond may also be used, such as imidazole, melamine, or combinations thereof. Suitable imidazole compounds may, for example, comprise 4,5-imidazole dicarboxylic acid, imidazole-2-carboxaldehyde, or 4-(imidazol-1-yl)phenol and so on. Suitable melamine compounds may, for example, comprise melamine cyanurate, tris(2-hydroxyethyl)-1,3,5-triazinetrione, melamine, melamine-formaldehyde, butoxymethyl melamine, hexamethoxymethylmelamine, methyl melamine, methoxymethyl melamine, or methoxymethyl methylol melamine and so on. Wherein, some of the modifiers, such as a 4,5-imidazole dicarboxylic acid may be directly intercalated into the layered clay material without any further modification.

Suitable modifiers of embodiments of the invention are not limited to the compounds mentioned above. Any compound which can be intercalated into the layered clay material and produce free radicals at a suitable temperature to stop or inhibit the thermal cracking of the polymer materials is within the scope of the invention.

The interlayer spacing of the layered clay material after intercalated with the modifier will be enlarged, such as by 13.00 Å, due to space occupied by the modifier. The modified clay, with an enlarged interlayer spacing may be mixed with the polymer material to form a clay-polymer composite. Note that it is easier for the modified clay with an enlarged interlayer spacing to be exfoliated and dispersed in polymer material.

In one embodiment, the modified clay is present in an amount ranging from about 1% to 10% by weight based on the total weight of the clay-polymer composite and is preferable ranging from about 3% to 7% by weight. It should be appreciated that, however, the amount of the modified clay may be adjusted according to intended use, and is not limited to a specific amount.

In one embodiment, the clay-polymer composite may be formed by mixing the modified clay and the monomer of the polymer material. The polymerization of the monomer of the polymer material occurs between the interlayer space within the modified clay, for example, by heating or adding catalyst. When the polymerization of the monomer occurs, the modified clay may be exfoliated and dispersed in the formed polymer material. For example, in one embodiment, the modified clay is dissolved in a solvent to form a modified clay solution. Then, the monomer of the epoxy resin, such as a Bisphenol-A novolac epoxy is added into the modified clay solution and stirred. A solvent drawing out process and heat treatment are applied to the solution. For example, the solution may be heated in an oven at 190° C. for 90 minutes. Thus, the monomer of the epoxy may be polymerized to form epoxy and the modified clay may be exfoliated and dispersed in the epoxy.

In addition, the clay-polymer composite of one embodiment of the invention may be formed by directly blending the modified clay and the polymer material. For example, a melt blending or a solution blending may be applied. Typically, melt blending may be performed to mix the modified clay and the polymer material in a closed system at a high temperature by using, for example, a single screw or double screw extruder, a Banbury mixer, a single screw or double screw extruder mixer, a continuous mixer, or a kneader. The mixing temperature may range from about 290° C. to 310° C. As for solution blending, the modified clay may be added into a polymer material solution and stirred at a high speed. After drawing out the solvent, the clay-polymer composite may thus be obtained. For example, an epoxy and a modified clay may be directly added into a mixer for mixing. The modified clay may be at least partially exfoliated and dispersed in the epoxy due to strong mechanical force provided by the mixer.

The clay-polymer composite formed according to the methods mentioned above may further be formed into a variety of structures with different shapes or constructions by injection molding, extrude molding, or compression molding. The clay-polymer composite may also be mixed with other polymer materials before or after molding.

Suitable polymer materials or their corresponding monomers of embodiments of the invention may comprise thermosetting polymers, thermoplastic polymers, or combinations thereof, such as epoxy, nylon, polyurethane, polystyrene, polyethylene, polyethylene chloride, corresponding monomers thereof, or combinations thereof. Because the clay-polymer composite of an embodiment of the invention comprises a modified clay dispersed therein and at least partially exfoliated therein, not only does the layered clay material prevent heat or air from transmitting into the polymer material but also the modifier on the dispersed layered clay may scavenge free radicals generated from thermal cracking or burning of the polymer material to prevent the polymer material attacked by the generated free radicals. Thus, further thermal cracking of the polymer material may be inhibited or stopped. The structural integer of the polymer material may be maintained to prevent heat transmission into the polymer material, further improving the flame-retardant properties of the clay-polymer composite. In one embodiment, an average heat release rate of the clay-polymer composite is reduced by about 50 to 150 kw/m$^2$ as compared with the counterpart in absence of the modified clay. In another embodiment, a limiting oxygen index of the clay-polymer composite is increased by about 3 to 10 as compared with the counterpart in absence of the modified clay.

In addition, other additives may be added to the clay-polymer composite, such as an impact modifier, a hardener, a flame retardant, a compatibilizer, an organic or inorganic filler, an ultraviolet absorber, a light stabilizer, an antistatic agent, a plasticizer, a lubricant, or an antioxidant and so on, according to the intended use.

Some examples are provided as followed for further understanding of some of the embodiments of the invention.

Example 1

Modifying the Clay (Montmorillonite) by $C_{60}$ $C_{60}$ powder was first modified. 10 g of $C_{60}$ was added into a solution of 0.414 g of formaldehyde and 2.416 g of N-methylglycine. Then, the solution was reflowed at 110° C. for 2 hours and dried to obtain a modified $C_{60}$ powder. The modified $C_{60}$ powder was further added into a solution of 16.7 ml of 0.1N HCl and 5.934 g of benzalkonium chloride and stirred to form a modifier.

2.89 g of montmorillonite was added into deionized water for 24 hours to obtain a clay solution. The clay solution was added dropwisely into the modifier to perform a cation exchange between the modifier and the layered clay material (montmorillonite). The cation-exchange capacity of montmorillonite was about 116 meq/100 g. Then, 1N HCl was used to adjust the pH value of the mixture to be between 3 and 4. The mixture was stirred overnight.

The mixture was centrifuged and the clay on the bottom was taken out. The clay was washed by deionized water and centrifuged repeatedly until no white deposit of AgCl appeared in the upper solution after adding $AgNO_3$. The centrifuged clay was stored in a refrigerator and then dried. After drying, the clay on the bottom was ground to form the modified clay.

Figure 1A:
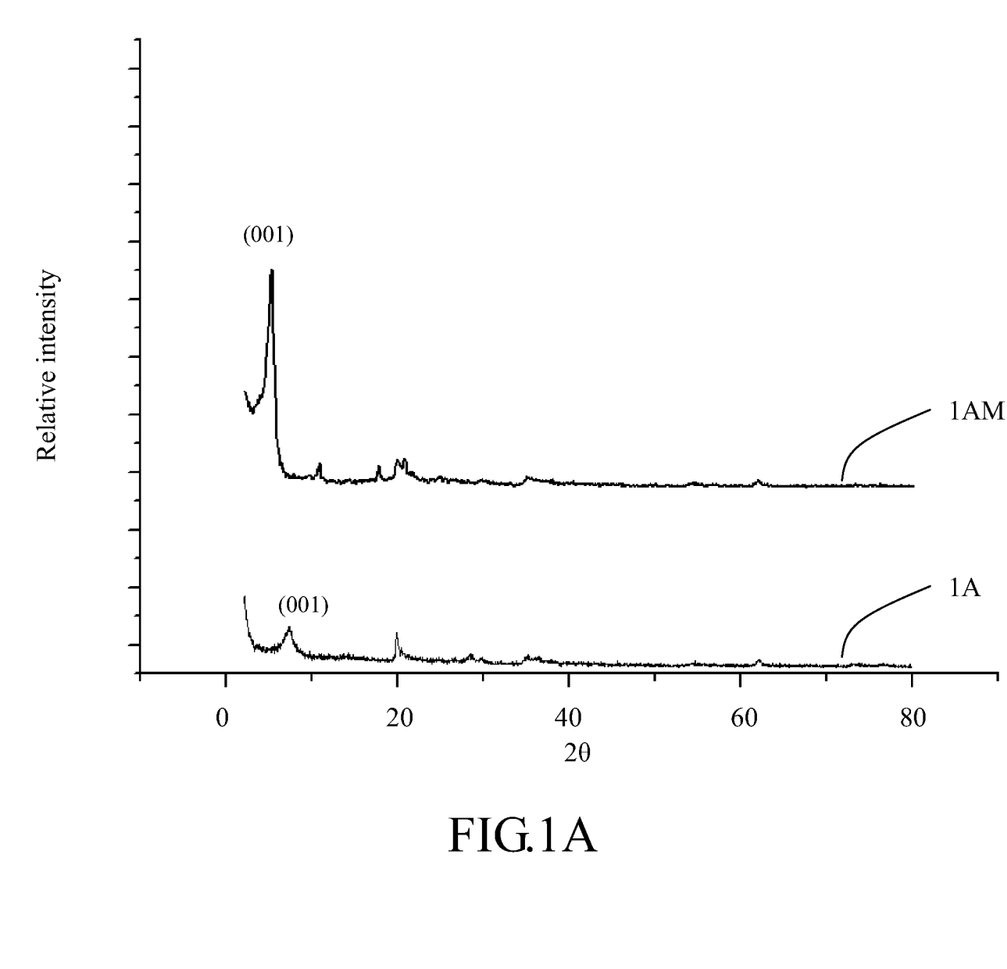
FIG. 1A shows XRD patterns of the modified clay of Example 1 and the clay without modification.

FIG. 1A shows XRD patterns of the modified clay of Example 1 and the clay without modification, wherein the curve 1AM corresponds to the XRD patterns of the modified clay of Example 1 and the curve 1A corresponds to the XRD patterns of the clay without modification. As shown in FIG. 1A, the diffraction peak corresponding to the plane 001 was shifted leftward, which means that the modified $C_{60}$ was intercalated into montmorillonite and thus the interlayer spacing of the layered clay (montmorillonite) was enlarged. In other words, the interlayer space of the layered clay was occupied by the modified $C_{60}$ and the d-spacing of plane 001 was thus enlarged. The interlayer spacing of the modified clay was increased from the original 12.01 Å to 21.60 Å.

Then, a clay-polymer composite comprising the modified clay of Example 1 was formed. First, a suitable amount of the modified clay was added into a solvent of propylene glycol methyl ether (PM) and stirred to be dissolved. A suitable amount of Bisphenol-A novolac epoxy was then added into the solution mentioned above and stirred. Following, the mixture was added into a mold and dried in a vacuum oven. The dried epoxy was put into an oven and was hardened at 190° C. for about 90 to 180 minutes. Thus, a bulk of epoxy was obtained, which was a clay-polymer composite of one embodiment of the invention.

Figure 1B:
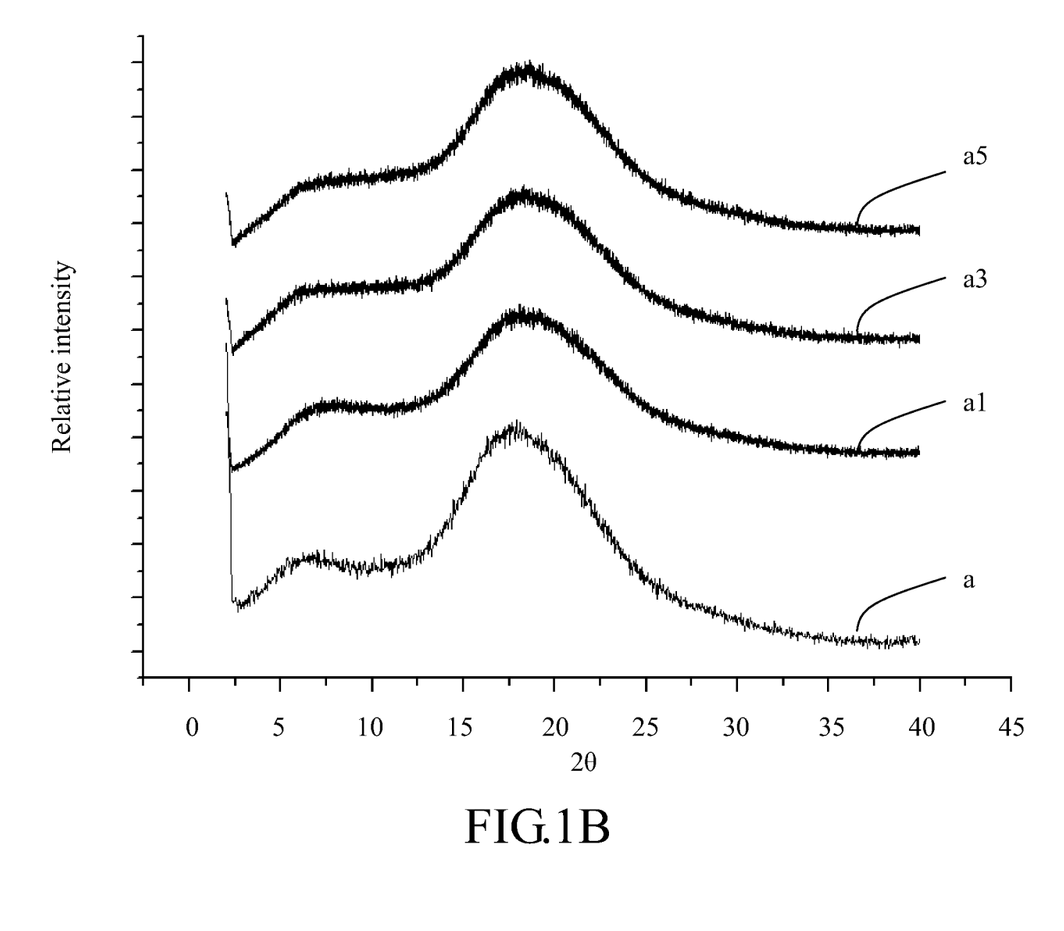
FIG. 1B shows XRD patterns of the clay-polymer composite of Example 1.

FIG. 1B shows XRD patterns of the clay-polymer composite of Example 1, wherein the curve a corresponds to the XRD patterns of the epoxy without adding any modified clay (a comparative example) and the curves a1, a3, and a5 correspond to the XRD patterns of the clay-polymer composites with 1 wt %, 3 wt %, and 5 wt % of the modified clay, respectively. As shown in FIG. 1B, there was no peak corresponding to the 001 plane of the montmorillonite, which was found like that shown in FIG. 1A, which means that after the modified clay was added into the epoxy and further dried and hardened, the modified clay was at least partially exfoliated. Because the modified clay was at least partially exfoliated, the spacing between the planes or the grain size was too small to show enough intensity in the XRD patterns.

Example 2

Modifying the Layered Double Hydroxide (LDH) by Imidazole

First, layer double hydroxide (in this example, [LiAl$_2$] LDH) was formed. A mixture of 7.28 g of LiNO$_3$.3H$_2$O and 78.82 g of Al(NO$_3$)$_3$.9H$_2$O was dissolved in 400 ml of deionized water, followed by adding of 50.4 g of NaOH. The mixture mentioned above was stirred for 1 hour and the pH value of the mixture was maintained at 13. Then, the mixture was put into an autoclave at 100° C. for 24 hours. The mixture was centrifuged repeatedly and the clay on the bottom was washed, dried, and ground to obtain a powder of [LiAl$_2$]LDH. The obtained layered double hydroxide had an anion-exchange capacity of about 420 meq/100 g.

4,5-imidazole dicarboxylic acid was dissolved in 200 ml of deionized water to form a modifier. 6.3 g of [LiAl$_2$]LDH was dissolved in deionized water and stirred for 24 hours to obtain a clay solution. Then, the clay solution was added dropwisely into the modifier and kept at 50° C. for 2 days to perform an anion exchange between [LiAl$_2$]LDH and 4,5-imidazole dicarboxylic acid. The mixture was then centrifuged several times and the clay on the bottom was washed, dried, and ground to obtain a modified clay.

Figure 2A:
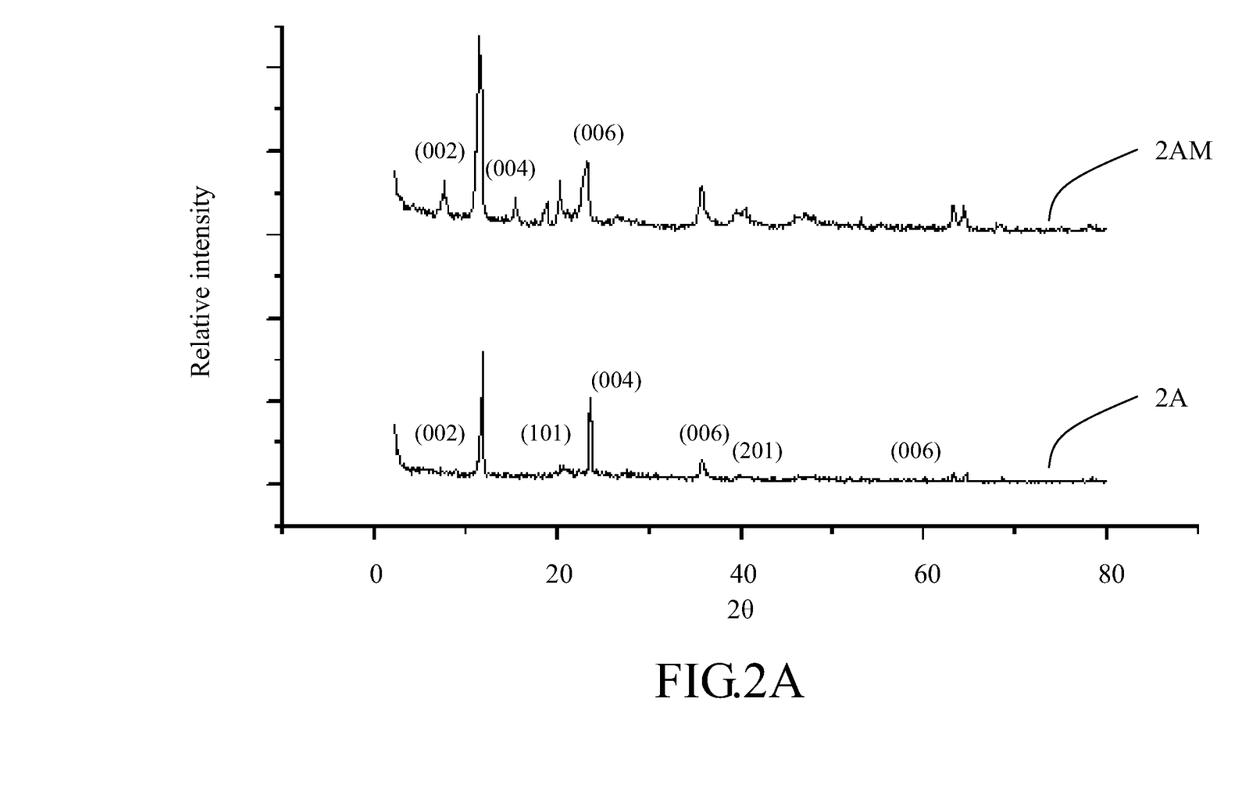
FIG. 2A shows XRD patterns of the modified clay of Example 2 and the clay without modification.

FIG. 2A shows XRD patterns of the modified clay of Example 2 and the clay without modification, wherein the curve 2AM corresponds to the XRD patterns of the modified clay of Example 2 and the curve 2A corresponds to the XRD patterns of the clay ([LiAl$_2$]LDH) without modification. As shown in FIG. 2A, the diffraction peak corresponding to the plane 002 was shifted leftward, which means that the 4,5-imidazole dicarboxylic acid was intercalated into [LiAl$_2$] LDH and thus the interlayer spacing of the layered clay ([LiAl$_2$]LDH) was enlarged. In other words, the interlayer space of the layered clay was occupied by the modifier (4,5-imidazole dicarboxylic acid) and the d-spacing of plane 002 was thus enlarged. The interlayer spacing of the modified clay was increased from the original 7.68 Å to 11.70 Å.

Then, a clay-polymer composite comprising the modified clay of Example 2 was formed. First, a suitable amount of the modified clay was added into a solvent of propylene glycol methyl ether (PM) and stirred to be dissolved. A suitable amount of Bisphenol-A novolac epoxy was then added into the solution mentioned above and stirred. Following, the mixture was added into a mold and dried in a vacuum oven. The dried epoxy was put into an oven and was hardened at 190° C. for about 90 to 180 minutes. Thus, a bulk of epoxy was obtained, which was a clay-polymer composite of one embodiment of the invention.

Figure 2B:
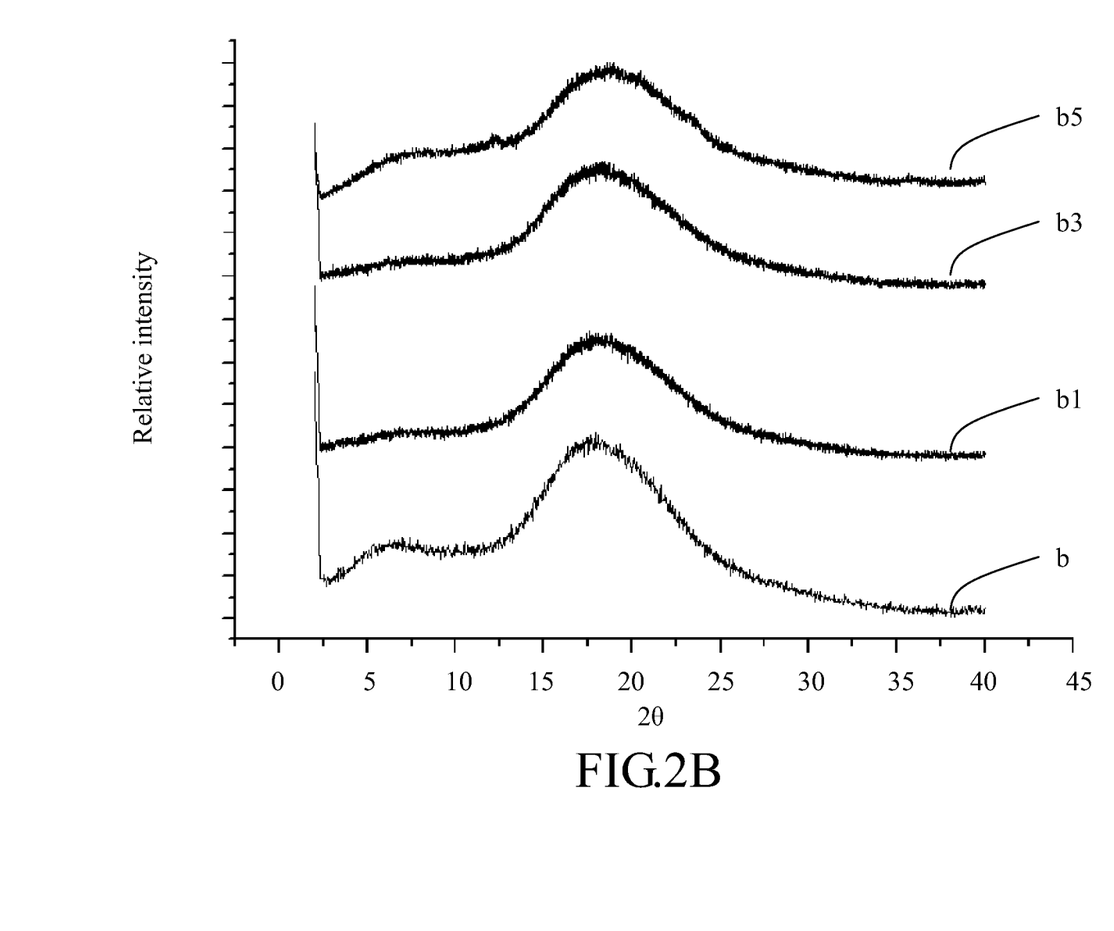
FIG. 2B shows XRD patterns of the clay-polymer composite of Example 2.

FIG. 2B shows XRD patterns of the clay-polymer composite of Example 2, wherein the curve b corresponds to the XRD patterns of the epoxy without adding any modified clay and the curves b1, b3, and b5 correspond to the XRD patterns of the clay-polymer composites with 1 wt %, 3 wt %, and 5 wt % of the modified clay, respectively. As shown in FIG. 2B, there was no peak corresponding to the 002 plane of [LiAl$_2$]LDH which was found like that shown in FIG. 2A, which means that after the modified clay was added into the epoxy and further dried and hardened, the modified clay was at least partially exfoliated. Because the modified clay was at least partially exfoliated, the spacing between the planes or the grain size was too small to show enough intensity in the XRD patterns.

Example 3

Modifying the Clay (Montmorillonite) by C$_{60}$

Example 3 is similar to Example 1. The main difference between Example 3 and Example 1 is that benzalkonium chloride was not used to modify the layered clay material in Example 3.

C$_{60}$ powder was first modified. 10 g of C$_{60}$ was added into a solution of 0.414 g of formaldehyde and 2.416 g of N-methylglycine. Then, the solution was reflowed at 110° C. for 2 hours and dried to obtain a modified C$_{60}$ powder. The modified C$_{60}$ powder was further added into a solution of 16.7 ml of 0.1N HCl and stirred to form a modifier.

2.89 g of montmorillonite was added into deionized water for 24 hours to obtain a clay solution. The clay solution was added dropwisely into the modifier to perform a cation exchange between montmorillonite and the modified C$_{60}$. The cation-exchange capacity of montmorillonite was about 116 meq/100 g. Then, 1N HCl was used to adjust the pH value of the mixture to be between 3 and 4. The mixture was stirred overnight.

The mixture was centrifuged and the clay on the bottom was taken out. The clay was washed by deionized water and centrifuged repeatedly until no white deposit of AgCl appeared in the upper solution after adding of AgNO$_3$. The centrifuged clay was stored in a refrigerator and then dried. After drying, the clay on the bottom was ground to form the modified clay.

Figure 3A:
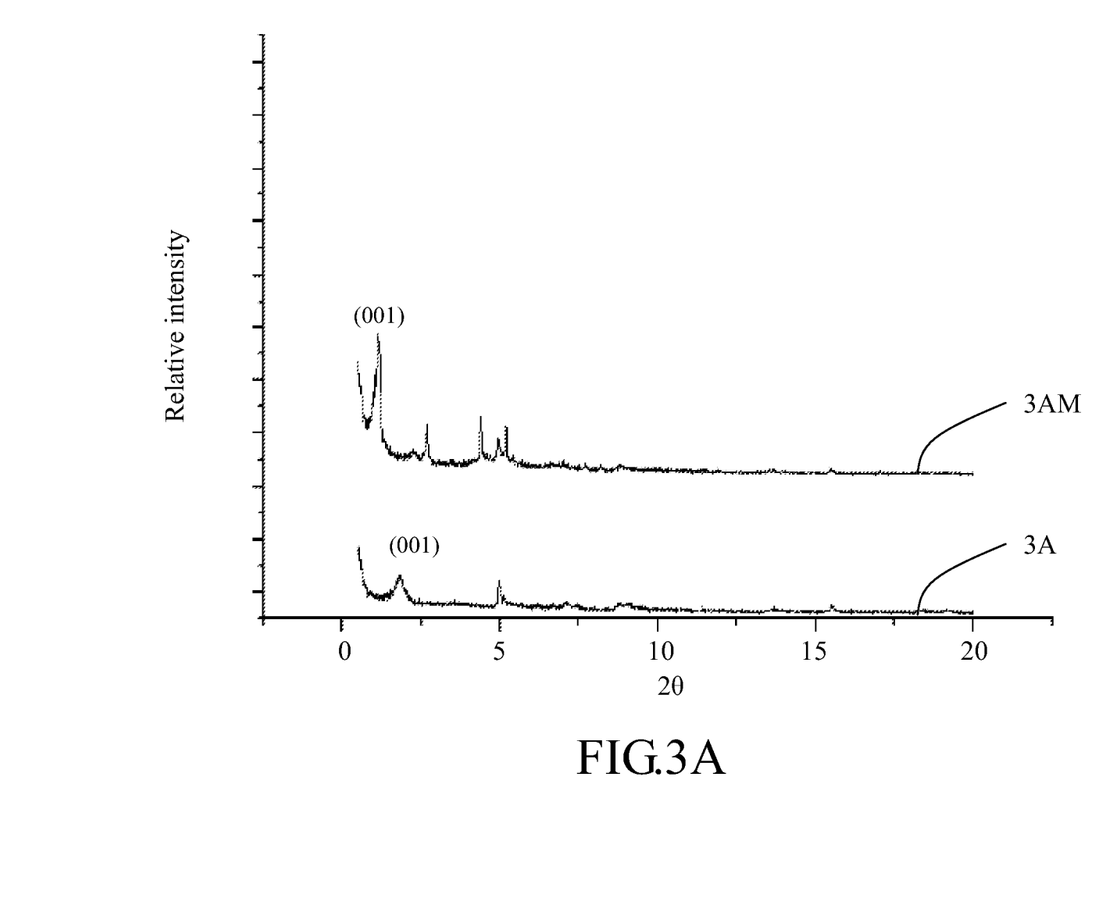
FIG. 3A shows XRD patterns of the modified clay of Example 3 and the clay without modification.

FIG. 3A shows XRD patterns of the modified clay of Example 3 and the clay without modification, wherein the curve 3AM corresponds to the XRD patterns of the modified clay of Example 3 and the curve 3A corresponds to the XRD patterns of the clay without modification. As shown in FIG. 3A, the diffraction peak corresponding to the plane 001 was shifted leftward, which means that the modified C$_{60}$ was intercalated into montmorillonite and thus the interlayer spacing of the layered clay (montmorillonite) was enlarged. In other words, the interlayer space of the layered clay was occupied by the modified C$_{60}$ and the d-spacing of plane 001 was thus enlarged. The interlayer spacing of the modified clay was increased from the original 12.01 Å to 20.05 Å.

Then, a clay-polymer composite comprising the modified clay of Example 3 was formed. First, a suitable amount of the modified clay was added into a solvent of propylene glycol methyl ether (PM) and stirred to be dissolved. A suitable amount of Bisphenol-A novolac epoxy was then added into the solution mentioned above and stirred. Following, the mixture was added into a mold and dried in a vacuum oven. The dried epoxy was put into an oven and was hardened at 190° C. for about 90 to 180 minutes. Thus, a bulk of epoxy was obtained, which was a clay-polymer composite of one embodiment of the invention.

Figure 3B:
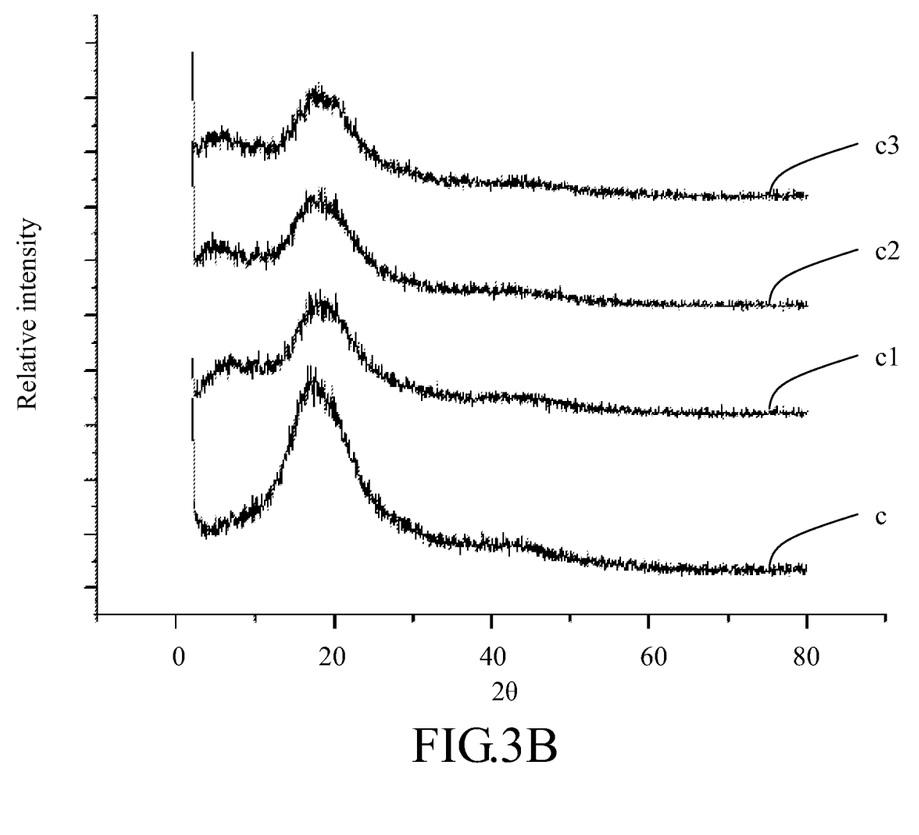
FIG. 3B shows XRD patterns of the clay-polymer composite of Example 3.
Figure 3C:
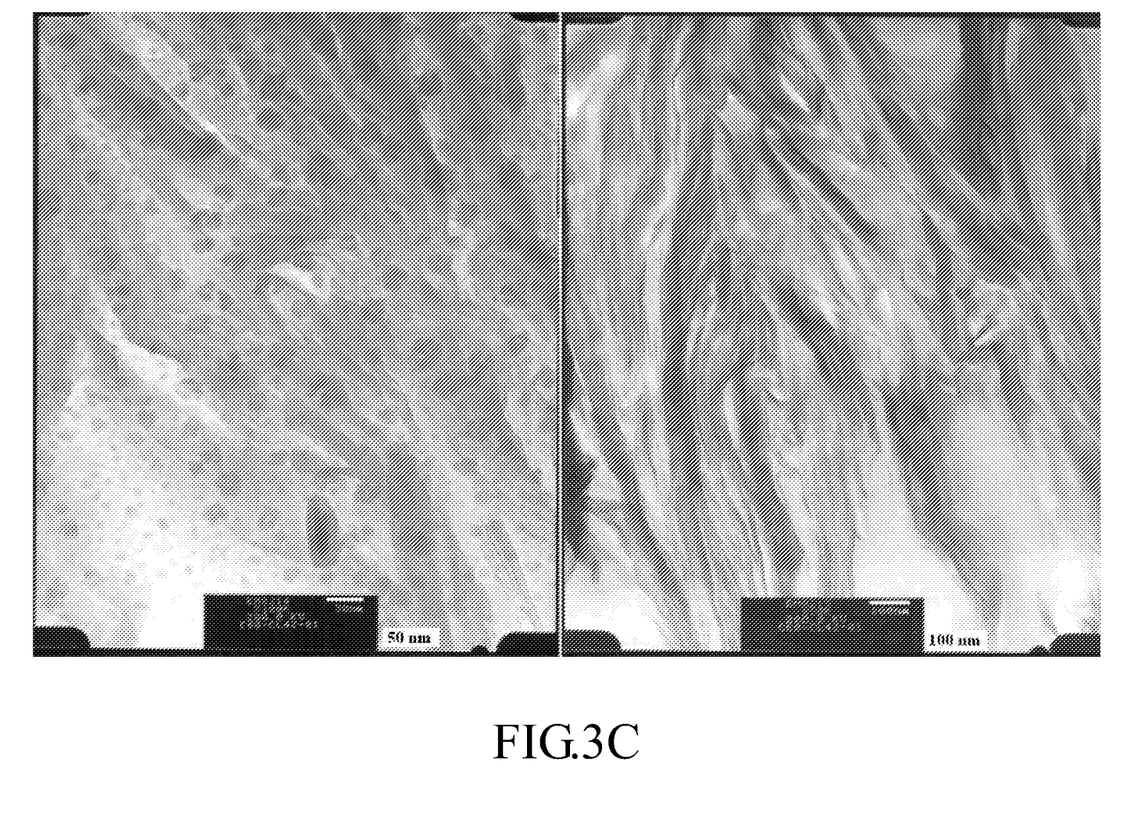
FIG. 3C shows TEM pictures of the clay-polymer composite of Example 3.

FIG. 3B shows XRD patterns of the clay-polymer composite of Example 3, wherein the curve c corresponds to the XRD patterns of the epoxy without adding any modified clay and the curves c1, c3, and c5 correspond to the XRD patterns of the clay-polymer composites with 1 wt %, 3 wt %, and 5 wt % of the modified clay, respectively. As shown in FIG. 3B, there was no peak corresponding to the 001 plane of the montmorillonite which was found like that shown in FIG. 3A, which means that after the modified clay was added into the epoxy and further dried and hardened, the modified clay was at least partially exfoliated. Because the modified clay was at least partially exfoliated, the spacing between the planes or the grain size was too small to show enough intensity in the XRD patterns. FIG. 3C shows TEM pictures of the clay-polymer composite of Example 3, wherein the left picture has a larger magnitude than that of the right picture. As shown in FIG. 3C, it was found that a portion of the modified clay was exfoliated and dispersed in the polymer material (epoxy). It can also be found in the left picture of FIG. 3C that modified $C_{60}$ was intercalated on the surface of the layered clay.

Example 4

Modifying the Layered Double Hydroxide (LDH) by Imidazole

Example 4 is similar to Example 2. The main difference between Example 4 and Example 2 was that the layered double hydroxide used in Example 4 was Mg—Al-LDH and not [LiAl$_2$]LDH.

First, layer double hydroxide (in this example, Mg—Al-LDH) was calcined at 500° C. for 5 hours. Then, 4,5-imidazole dicarboxylic acid was dissolved in 200 ml of deionized water to form a modifier. 6.3 g of the heat treated Mg—Al-LDH was dissolved in deionized water and stirred for 24 hours to obtain a clay solution. Then, the clay solution was added dropwisely into the modifier and kept at 50° C. for 2 days to perform an anion exchange between Mg—Al-LDH and 4,5-imidazole dicarboxylic acid. The mixture was then centrifuged several times and the clay on the bottom was washed, dried, and ground to obtain a modified clay.

Then, a clay-polymer composite comprising the modified clay of Example 4 was formed. First, a suitable amount of the modified clay was added into a solvent of propylene glycol methyl ether (PM) and stirred to be dissolved. A suitable amount of Bisphenol-A novolac epoxy was then added into the solution mentioned above and stirred. Following, the mixture was added into a mold and dried in a vacuum oven. The dried epoxy was put into an oven and was hardened at 190° C. for about 90 to 180 minutes. Thus, a bulk of epoxy was obtained, which was a clay-polymer composite of one embodiment of the invention.

Table 1 shows some flame-retardant properties of the clay-polymer composites of Examples 1 to 4, wherein the modified clay added in each example was 3 wt %. The comparative example corresponds to the pure epoxy without the addition of any modified clay.

The limiting oxygen index (LOI) was used to determine the flame-retardant property of the material. The oxygen index flammability tester was used to test the flame-retardant property of the clay-polymer composite. A test specimen (L: 3.8 cm, W: 2.4 cm, T: 0.2 cm) was ignited from a top side and a flow of air containing oxygen was provided from a bottom side of the test specimen. Through adjusting the partial pressure of oxygen and nitrogen in the oxygen index flammability tester, the minimum oxygen partial pressure needed for the specimen to begin burning can be determined and thus allowing the limiting oxygen index to be determined. The formula for calculating the limiting oxygen index is as followed:

LOI=volume of oxygen/(volume of oxygen+volume of nitrogen).

Therefore, a higher limiting oxygen index represents that more oxygen partial pressure was needed for a specimen that was burning. In addition, the thermal irradiation properties of the clay-polymer composites tested by the cone calorimeter are also listed in Table 1. For the thermal irradiation properties test, the specimen (L: 10 cm, W: 10 cm, T: 0.5 cm) was heated under an irradiative heat flow of 50 kW/m$^2$.

As shown in Table 1, the limiting oxygen indices of the clay-polymer composites of embodiments of the invention (Examples 1 to 4) were all higher than that of the comparative example. The limiting oxygen indices of the clay-polymer composites were increased by about 6 to 9 as compared with the counterpart in absence of the modified clay. In addition, the average heat release rates, the total heat released, and the average mass loss rates of each example were all less than that of the comparative example. The average heat release rates of the clay-polymer composites were reduced by about 60 to 110 kW/m as compared with the counterpart in absence the modified clay.

Although the above mentioned Examples 1 to 4 were all about introducing the modified clay into thermosetting polymer materials, embodiments of the invention are not limited to thermosetting polymer materials. In another embodiment, the modified clay is introduced into a thermoplastic polymer material to improve its flame-retardant property. Table 2 shows flame-retardant properties of a clay-polymer composite formed by a modified clay and Nylon, wherein the modified clay added was 2 phr.

As shown in Table 2, the modified clay of embodiments of the invention were also adapted to be introduced into thermoplastic polymer materials, wherein the average heat release rate and the total heat released were also lowered.

TABLE 1

| Sample | Average heat release rate (kW/m$^2$) | | Total heat released (MJ/m$^2$) | | Average mass loss rate (g/s) | | Limiting oxygen index | |
|---|---|---|---|---|---|---|---|---|
| | | | | | | | | |
| Comparative example | 163.69 | Difference to the comparative example | 98.67 | Difference | 10.375 | Difference | 19 | Difference |
| Example 1 | 98.02 | −65.67 | 94.36 | 4.31 | 7.548 | 2.827 | 26 | 7 |
| Example 2 | 53.99 | −109.7 | 9.73 | 88.94 | 3.96 | 6.415 | 28 | 9 |
| Example 3 | 95.72 | −67.97 | 79.26 | 19.41 | 6.689 | 3.686 | 26 | 7 |
| Example 4 | 81.3 | −82.39 | 14.24 | 84.43 | 9.39 | 0.985 | 25 | 6 |

TABLE 2

| Sample | Average heat release rate (kW/m²) | Total heat released (MJ/m²) | Average mass loss rate (g/s) |
|---|---|---|---|
| Nylon | 386.96 | 158.67 | 17.327 |
| Clay-Nylon composite | 242.16 | 106.81 | 49.342 |

In summary, in embodiments of the invention, the modified clay was formed by intercalating the modifier into the layered clay material. The modified clay of embodiments of the invention may improve the flame-retardant property of the clay-polymer composite, solving the inflammable problem of polymer materials. Through intercalating the modifier containing a conjugated double bond structure into the layered clay material, the modifier as well as its conjugated double bond structure may be dispersed in the polymer material along with the at least partially exfoliated modified clay. The dispersed modifier is capable of producing free radicals when heated to scavenge free radicals generated from thermal cracking or burning of the polymer material to prevent further thermal cracking of the polymer material, improving the flame-retardant property of the clay-polymer composite.

While the invention has been described by way of Example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flame-retardant clay-polymer composite containing a modified montmorillonite clay, comprising:
   a polymer material; and
   a modified montmorillonite clay, dispersed and at least partially exfoliated in the polymer material, presented in an amount ranging from 3% to 7% by weight based on the total weight of the clay-polymer composite and having an interlayer spacing of larger than 13 Å, comprising:
      a montmorillonite clay; and
      a modified modifier, being bonded or intercalated into the montmorillonite clay,
   wherein the modifier comprises C60, which has a plurality of conjugated C—C double bonds and is first modified by formaldehyde and N-methylglycine, and further modified by benzalkonium chloride and hydrochloric acid to a soluble state and make the surface of the modified modifier have a functional group, and
   wherein the modified modifier is bonded or intercalated into the surface of the exfoliated montmorillonite clay by the functional group through ion exchange, the amount of the intercalated modifier ranges from 50% to 70% of the ion exchange capacity of the clay, the plurality of conjugated C—C double bonds of C60 are used for producing the majority of free radicals after being heated to between 340° C. and 450° C. to scavenge free radicals of the polymer material at a temperature near the thermal cracking temperature of the polymer material ranging between 250° C. and 500° C. to prevent further thermal cracking of the polymer material, an average heat release rate of the clay-polymer composite is reduced by 60 kW/m2 to 110 kW/m2 as compared with the polymer material in absence of the modified clay, and a limiting oxygen index (LOI) of the clay-polymer composite is increased by 6 to 9 volumetric percentage of oxygen units as compared with the polymer material in absence of the modified clay.

2. The clay-polymer composite as claimed in claim 1, wherein the montmorillonite clay comprises the montmorillonite clay of a cation exchange type or the montmorillonite clay of an anion exchange type.

3. The clay-polymer composite as claimed in claim 1, wherein the modifier produces free radicals only after being heated to over about 300° C.

4. The clay-polymer composite as claimed in claim 1, wherein the montmorillonite clay has a cation-exchange capacity ranging from about 50 to 300 meq/100 g.

5. The clay-polymer composite as claimed in claim 1, wherein the montmorillonite clay has an anion-exchange capacity ranging from about 50 to 1000 meq/100 g.

6. The clay-polymer composite as claimed in claim 1, wherein the polymer material comprises a thermosetting polymer, a thermoplastic polymer, or combinations thereof.

7. The clay-polymer composite as claimed in claim 1, wherein the polymer material comprises epoxy, nylon, polyurethane, polystyrene, polyethylene, polyethylene chloride, or combinations thereof.

* * * * *